March 28, 1967    E. J. ZAHURANEC    3,311,131
RESTRICTING ORIFICE
Filed Feb. 4, 1964

INVENTOR.
EMERY J. ZAHURANEC
BY
*Fay & Fay*
ATTORNEYS

United States Patent Office 3,311,131
Patented Mar. 28, 1967

3,311,131
RESTRICTING ORIFICE
Emery J. Zahuranec, Solon, Ohio, assignor to Crawford Fitting Company, Cleveland, Ohio, a corporation of Ohio
Filed Feb. 4, 1964, Ser. No. 342,395
5 Claims. (Cl. 138—44)

The present invention relates to a restricting orifice, and more particularly to a restricting orifice assembly wherein the diameter is quickly adjustable and the assembly is readily insertable between unmodified ends of tubes, pipes and the like.

Fluid systems of various types often require controlled flow at a given pressure. Further, it is often necessary to provide means to dissipate excess energy when flow is terminated to prevent objectionable hammering in the fluid lines.

Fluid systems, such as those utilized in connection with temperature control, instrumentation, control systems and the like, are delicate in their make-up and, by their ultimate intended use, must be sensitive. Accordingly, the delicate mechanisms associated therewith must be protected. Several control and protective devices are available to regulate flow, dissipate unwanted energy at flow cutoff and achieve the normal useful functions relating to such systems; however, objections arise in conjunction with their use. For example, flow controlling valves are well known for their capabilities to regulate flow; however, the attendant cost virtually prohibits their use because of the great quantities required in the simplest of systems.

A more simple device to accomplish this end is the restricting orifice. A simplified form illustrating this principle is the conventional orifice plate which may be laterally inserted in fluid lines, conduits and the like. Such construction requires that the plate be sealed at its periphery to prevent the entry of foreign and unwanted materials which would contaminate the line. Moreover, a poor fit could cause failure of the sensitive system.

Numerous other devices are available to achieve the ends heretofore mentioned, but their use is generally found objectionable for one reason or another.

The orifice assembly of the instant invention obviates many of the difficulties and objections raised in connection with prior art devices, while providing a simple and economical means to achieve the objectives of such devices. This will become readily apparent when considered in light of the disclosure below.

The instant invention further contemplates the provision of an orifice tube which is fluid-tightly retained in the orifice assembly. The orifice tube may be conveniently and quickly removed and replaced by a tube with the same outside diameter but a reduced inside diameter, thereby providing a different sized orifice to fulfill the needs of the user without requiring a whole new assembly.

Further, the instant invention contemplates providing the assembly with plural swage type connections, thereby permitting the assembly to be quickly inserted between the ends of two tubes, the latter requiring no subsequent modification after cutting to length.

It is therefore an object of this invention to provide a new and improved restricting orifice device.

It is a further object of this invention to provide a restricting orifice device wherein the orifice diameters may be varied over a wide range.

It is a further object of this invention to provide an orifice assembly which will minimize turbulence.

It is a further object of this invention to provide a restricting orifice device which will facilitate quick adjustment of the orifice size.

It is a still further object of this invention to provide a restricting orifice assembly which may be readily inserted between the ends of unmodified pipes, tubes or the like.

Further and fuller objects will become readily apparent when reference is made to the accompanying drawing, wherein like reference characters refer to like parts.

Figure 1:
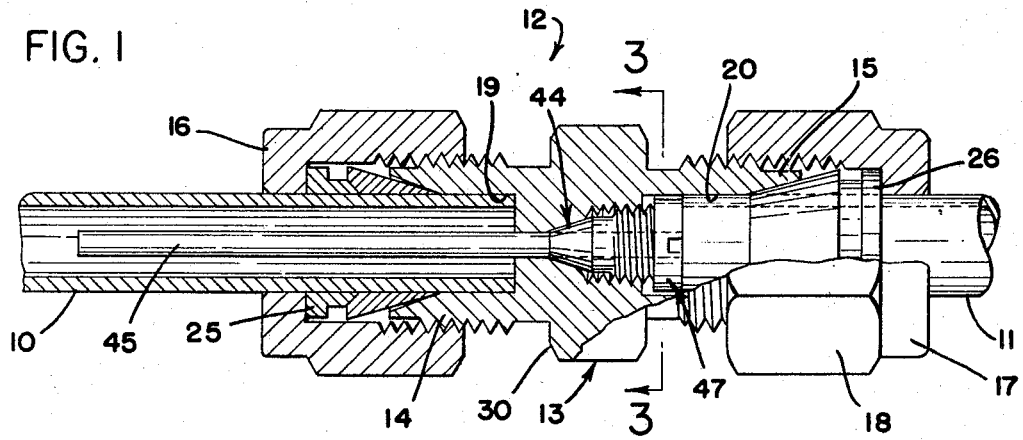
FIG. 1 is an elevational view of the novel restricting orifice assembly inserted between coaxial conduits with the left-hand portion of the orifice assembly in section to illustrate the novel orifice tube and the couplings hand tight.

As seen in FIG. 1, the novel orifice assembly indicated generally at 12 is interposed between fragments of the conduits 10 and 11. The orifice assembly 12 includes a main body portion 13 with axially extending ends 14 and 15. The end portions 14 and 15 are externally threaded so as to receive driving nuts 16 and 17. The driving nuts are provided with tool pads 18, such as those shown fragmentarily in the right-hand portion of FIG. 1, to facilitate reception of suitable tool means to rotate the same.

The orifice assembly 12 is further provided with internal counterbored portions 19 and 20 to receive the conduits 10 and 11. Frusto-conical camming mouth portions 21 and 22 are coaxial with the counterbored portions 19 and 20 respectively. The camming mouth portions 21 and 22 are adapted to receive front ferrule means 23 and 24 respectively. Back ferrule means 25 and 26 assist in driving the front ferrule means 23 and 24 forwardly into the camming mouth to swagingly grip the conduits 10 and 11 under the force exerted by rotation of the driving nuts 16 and 17. The back ferrules 25 and 26 further assist in the gripping action when finally positioned, while both sets of ferrules provide a fluid-tight seal about the conduits.

Figure 3:
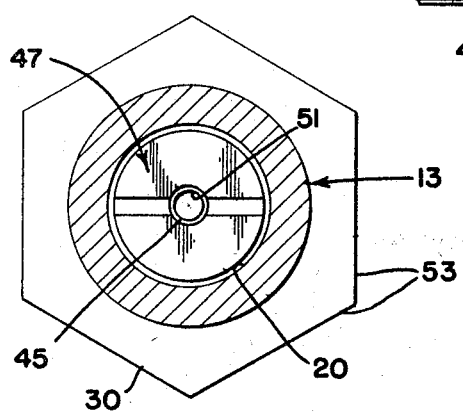
FIG. 3 is a view taken along the line 3—3 of FIG. 1.

Centrally of the assembly, as indicated at 30, is a flange which may be of polygonal configuration, as seen in FIG. 3, to provide tool pads 53 to receive a tool means, so that the main body portion may be non-rotatably held while the driving nuts 16 and 17 are rotated to provide the gripping engagement of the conduits 10 and 11.

Figure 2:
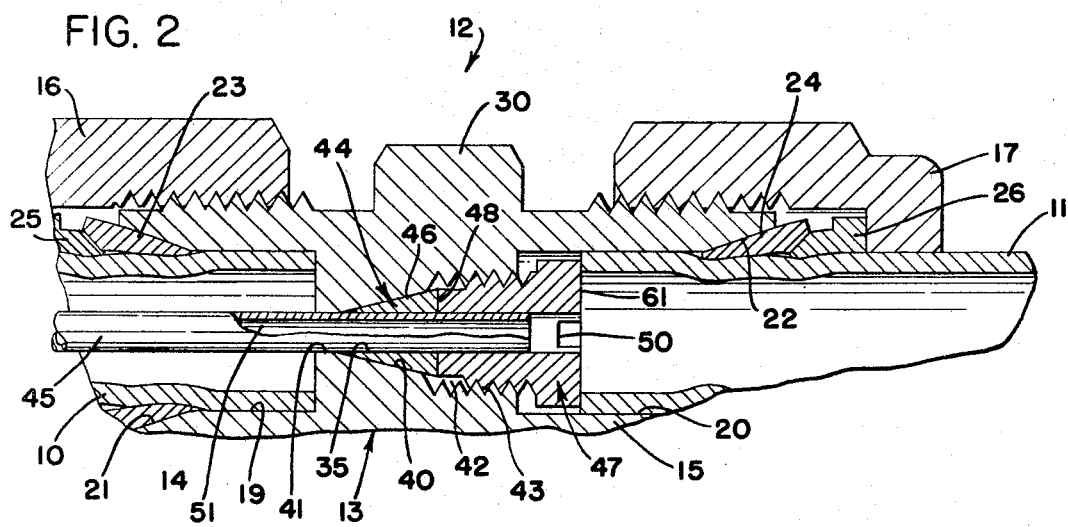
FIG. 2 is an enlarged fragmentary view of the orifice, with parts of the orifice in section and the couplings swaged.

As is best seen in FIG. 2, the main body portion is apertured between the counterbores 19 and 20. A frusto-conical bore 40 terminates in cylindrical bore 41 at one end, while the other end flares outwardly to a counterbored portion 42, which is internally threaded as at 43. An orifice tube 45 extends through the opening 41 and rearwardly into the chamber defined by the counterbore 20.

Figure 4:
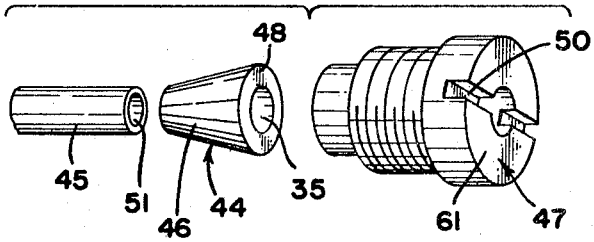
FIG. 4 is an exploded view of the orifice tube and the locking means to hold the orifice tube in the union.

A ferrule 44, which has a frusto-conical periphery 46, is received in tight engagement with the frusto-conical mouth portion 40. The inner diameter 35 of the ferrule is slightly greater than the outside diameter of the tube 45. An externally threaded driving nut means 47 engages the rear face portion 48 of the frusto-conical ferrule 44 so as to force it into wedging engagement with the mouth 40. It is to be understood that the ferrule 44 and the driving means could be integral, if desired. Rotation of the driving means 47 forces the ferrule 44 against the frusto-conical mouth 40, thereby constricting it fluid-tightly to grip the tube 45. A tool slot 50, which is best seen in FIGS. 3 and 4, is provided to facilitate rotation of the driving means during assembly or disassembly.

It has been discovered that improvement in the gripping action of the ferrule 44 can be obtained by carefully controlling the surface finish characteristics of the interfaces of the tapered mouth 40 and the cooperating portion of the ferrule 46. By so doing, movement of the ferrule along the surface of the camming mouth is smooth and unretarded, with the result that the gripping action of the ferrule takes place to insure optimized holding and sealing power. The exercise of the surface finish control heretofore mentioned reduces the amount of input torque required to complete the swaging action. The input torque is further decreased by improving the quality of the finish of the threads 43 and the threads on the driving nut means 47.

A kindred improvement is to be found in decreased tolerances between the aforementioned threads, which has the effect of distributing the load more evenly over the full number of contacting threads, thereby causing a reduction in the galling or seizing of the parts at the thread interface. This is particularly important when one considers that the driving means, being provided with the tool slot 50, enables only limited torque to be applied. However, with the surface finish controlled in the manner hereinafter described, a fluid-tight swage connection is had with a minimum amount of torque.

To the attainment of these ends, the camming mouth 40 and the cooperating portion 46 of the ferrule 44 are provided with a controlled surface finish of extremely fine quality ranging from about 4 to about 32 microinches, with a finish of any larger number being preferred. This represents about the best quality available on a commercially feasible basis, and permits the ferrule 44 to move smoothly within the camming mouth 40 during the take-up of the driving means.

While the ferrule 46 is separate from the driving means, the interface 48 is provided with a controlled surface finish of from about 8 to about 63 microinches. This enhances the forward drive on the ferrule and reduces the possibility of galling between the driving means and the ferrule.

As heretofore mentioned, the driving characteristics can be enhanced and appreciable reduction in galling achieved by producing the male threads with no looser than a class 3 fit and the female threads with no looser than a class 2 fit, although in actual practice a class 3 fit is usually obtained on the female threads as well. The net effect of a tighter engagement between the male and female threads results in even load distribution over the full number of engaged threads, rather than having the load carried only by the first few threads. Further to improve antigalling and torque conversion characteristics, the threads 43 and cooperating threads 60 on the driving means 47 are provided with a surface finish from about 4 to about 32 R.M.S. (root means square). This permits the driving means 47 to be moved along the thread means without binding and contributes to the ease with which the joint may be made up.

With the fine surface finish on the cooperating parts, as heretofore described, it enables the driving means 47 to be rotated quite easily with a conventional screw driver or other wrench and sufficient torque may be thereby developed to swage the ferrule 44 into gripping engagement with the tube 45.

As viewed in the assembled position, it can be seen that the conduit 11 is bottomed on the flat face 61 of the driving means 47. When one contrasts this arrangement with the prior art devices wherein threads were exposed to the internal wall, it can be seen that an appreciable reduction in turbulence would be had with the embodiment described herein.

The tube 45 has an inner wall 51 which is provided with the surface finish desired for reducing friction in flow therethrough. It is readily apparent that the diameter of the internal wall 51 can be varied through a range of sizes down to that of a pin, thereby building versatility in the overall device. Such construction permits alternate use of several orifice tubes of different diameters and different lengths so that a wide range of orifices may be covered by providing a single assembly and a plurality of tubes. This, in effect, permits on-the-job selection of the particular size of orifice needed once the pressure is ascertained. From the manufacturing standpoint, it enables a standard assembly to be produced on a mass production scale with the only variable being the particular tube that is used in the assembly. It is to be appreciated that this construction facilitates a wide range of uses while not requiring considerable stocking of a plurality of parts.

When it becomes necessary to control flow in a line, the orifice assembly herein disclosed can be inserted in the manner hereinafter described. The proper size orifice tube is selected and placed in the bore 41. The driving means 47 is then rotated to force the ferrule or tapered end portion 44 into engagement with the tube. The conduits, such as those illustrated at 10 and 11, are then severed by a suitable cutting tool, and the respective ends are inserted in the bores 19 and 20. The coupling nuts 16 and 17 are then rotated so as to perform the swaging action and seal the conduits to the orifice assembly. In normal use, the coupling nuts are put on in a finger-tight position at the factory and rotation from one and one-quarter to one and one-half turns is all that is required to complete the swaging action so as to have a rigid fluid-tight joint. The orifice assembly is now in position and will work according to the principles of a fixed diameter orifice, which is well known in the art. If it becomes necessary to vary the orifice diameter, the coupling nut 17 is backed off and the conduit 11 removed. The driving means 47 is then released, and the orifice tube 45 removed and replaced with one of a smaller or larger inside diameter, it being understood that the limiting maximum diameter is that of a tube that will fit within the cylindrical bore 41. A new tube, such as that shown at 45, with the proper orifice diameter, is then inserted, and the driving means is rotated so that it wedgingly grips the outer periphery of the tube. The conduit 11 is then inserted in the bore 20, and the coupling nut 17 rotated to grip fluid-tightly the conduit 11.

It can thus be seen that the objects heretofore specified have been achieved. Although a single preferred embodiment has been shown, it is not intended that this be limiting inasmuch as such is necessary for ease of description of the invention. It is intended only that the limits of the invention be defined by the scope of the appended claims.

I claim:

1. A restricting orifice assembly comprising a main body portion having coupling means at opposite ends thereof, counterbored portions in said ends, an aperture joining said counterbores, said aperture being generally cylindrical and merging into an outwardly flaring mouth portion, said mouth portion terminating in a threaded bore, an orifice tube in said aperture, a frusto-conical ferrule in said mouth portion, and threaded driving means in said threaded bore to force said ferrule into fluid tight gripping engagement with said orifice tube.

2. A restricting orifice assembly comprising a main body portion having conduit gripping means at opposite ends thereof, an apertured portion through said body, said aperture being cylindrical and merging into an outwardly flaring mouth portion which terminates in a threaded bore, an orifice tube in said aperture, a frusto-conical ferrule having a smooth rear face coaxial with said orifice tube and seated in said outwardly tapering mouth portion, apertured threaded driving means having a smooth front face and a slotted head portion in said threaded bore to force said ferrule by cooperation of said smooth surfaces axially to grip said orifice tube without significant rotation of said ferrule, said threaded driving means having a flat face which extends transversely of said aperture to provide an abutment for a conduit.

3. The orifice assembly of claim 2, wherein said orifice tube extends into a bore in said threaded driving means and terminates short of said flat face.

4. A restricting orifice assembly for use in fluid lines comprising a main body portion having an aperture therethrough,
means at opposite ends of the body to effect a fluid-tight grip of said lines,
said aperture having a tapered bore terminating in a cylindrical portion,
an orifice tube in said tapered bore and extending through said cylindrical portion,
a ferrule having a frusto-conical exterior cooperating with said tapered bore to grip said tube fluid-tightly, and
driving means provided to force said ferrule axially into said tapered bore.

5. A restricting orifice assembly for attachment to conduits comprising a main body portion having coupling means at opposite ends thereof;
said coupling means having threads on said opposite ends and said coupling means further including driving nuts which cooperate with and are secured to the threads at the ends of said main body portion;
an aperture through said body, said aperture being cylindrical and merging into an outwardly flaring mouth portion and a threaded bore which terminates an outwardly extending shoulder and a second larger cylindrical aperture;
an orifice tube in said aperture and extending through said outwardly flaring mouth portion and threaded bore;
a frusto-conical ferrule coaxial with said orifice tube and seated in said outwardly flaring mouth portion, said frusto-conical ferrule having a smooth rear face portion;
apertured threaded driving means in said threaded bore, said driving means having a front smooth face portion which abuts the rear face portion of said ferrule in order to force said ferrule axially to grip said orifice tube without significant rotation of said ferrule, said driving means further having an expanded head portion slightly smaller than said second larger cylindrical aperture;
said threaded driving means having a flat face which extends transversely of said aperture to provide an abutment for said conduit and said threaded driving means further having tool engaging surface means in said flat face for permitting turning of said driving means into said threaded bore.

References Cited by the Examiner

UNITED STATES PATENTS

| | | | |
|---|---|---|---|
| 1,143,816 | 6/1915 | Duffy | 285—382.7 X |
| 1,580,558 | 4/1926 | McLaine | 138—44 |
| 2,182,811 | 12/1939 | Kocher | 285—382.7 X |
| 2,501,593 | 3/1950 | Becker | 138—44 |
| 2,676,470 | 4/1954 | Streitz | 138—44 X |
| 2,776,552 | 1/1957 | Thomas | 62—511 X |
| 3,103,373 | 9/1963 | Lennon et al. | 285—342 |

FOREIGN PATENTS 554,522    7/1943    Great Britain.

LAVERNE D. GEIGER, *Primary Examiner.*

C. L. HOUCK, *Assistant Examiner.*